Feb. 17, 1925.

A. B. YORK

LUMBER ELEVATOR

Filed Jan. 28, 1921

A. B. YORK

LUMBER·ELEVATOR

Filed Jan. 28, 1921

Arthur B. York,
INVENTOR
BY Victor J. Evans
ATTORNEY

Feb. 17, 1925.

A. B. YORK 1,527,104

LUMBER ELEVATOR

Filed Jan. 28, 1921    8 Sheets-Sheet 8

Arthur B. York,
INVENTOR

BY Victor J. Evans
ATTORNEY

Patented Feb. 17, 1925.

1,527,104

UNITED STATES PATENT OFFICE.

ARTHUR B. YORK, OF MISSOULA, MONTANA.

LUMBER ELEVATOR.

Application filed January 28, 1921. Serial No. 440,723.

*To all whom it may concern:*

Be it known that I, ARTHUR B. YORK, a citizen of the United States, residing at Missoula, in the county of Missoula and State of Montana, have invented new and useful Improvements in Lumber Elevators, of which the following is a specification.

This invention relates to a lumber handling device, the general object of the invention being to provide means for elevating lumber to the top of the pile so as to render it unnecessary for the lumber to be raised manually.

Another object of the invention is to provide means for conveying the lumber, after it has been raised, to the top of the pile where it can be easily dropped in its place upon the pile.

A further object of the invention is to provide a power driven truck for the apparatus so that it can be driven from one pile to another under its own power.

This invention also consists in certain other features of construction and in the combination and arrangement of the several parts, to be hereinafter fully described, illustrated in the accompanying drawings and specifically pointed out in the appended claims.

In describing my invention in detail, references will be had to the accompanying drawings wherein like characters denote like or corresponding parts throughout the several views, and in which:—

Figure 1:
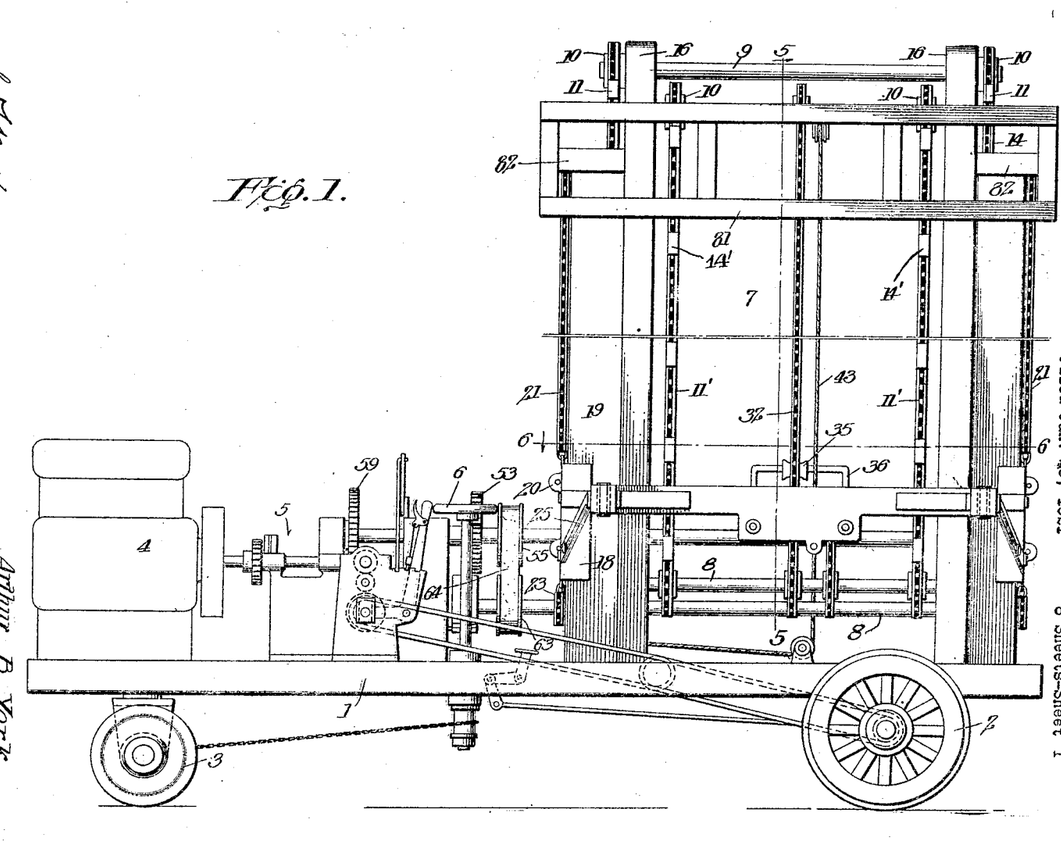
Figure 1 is a view of one side of the apparatus.
Figure 2:
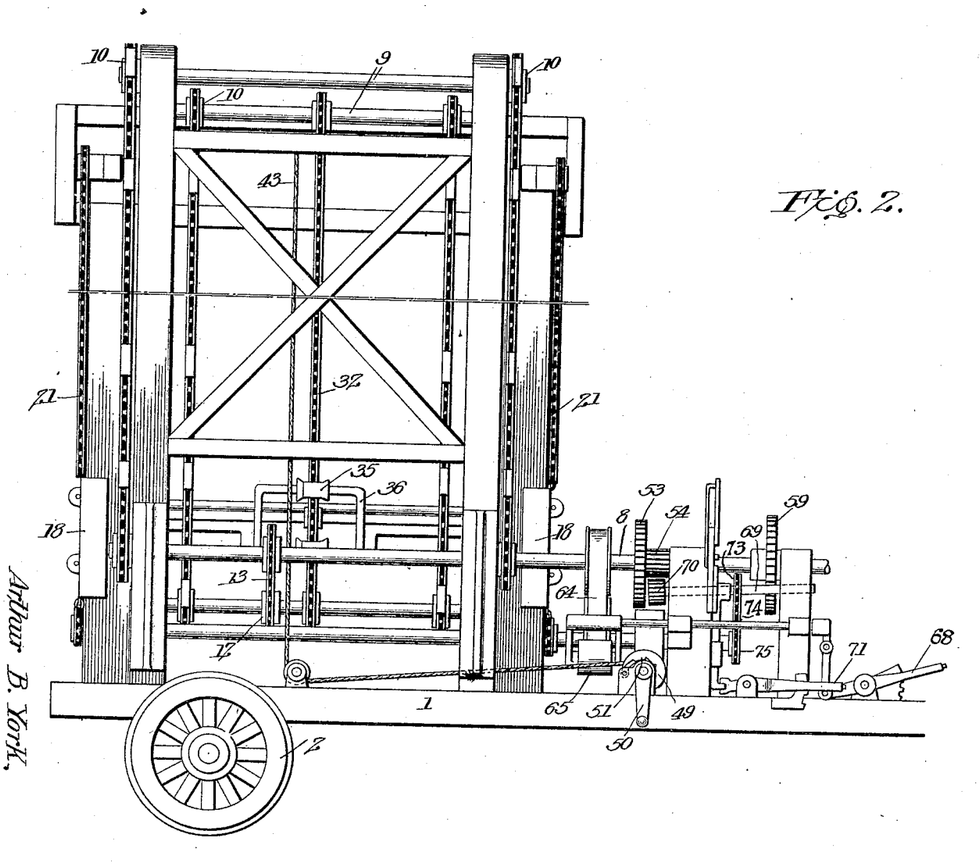
Figure 2 is a view of the other side.
Figure 3:
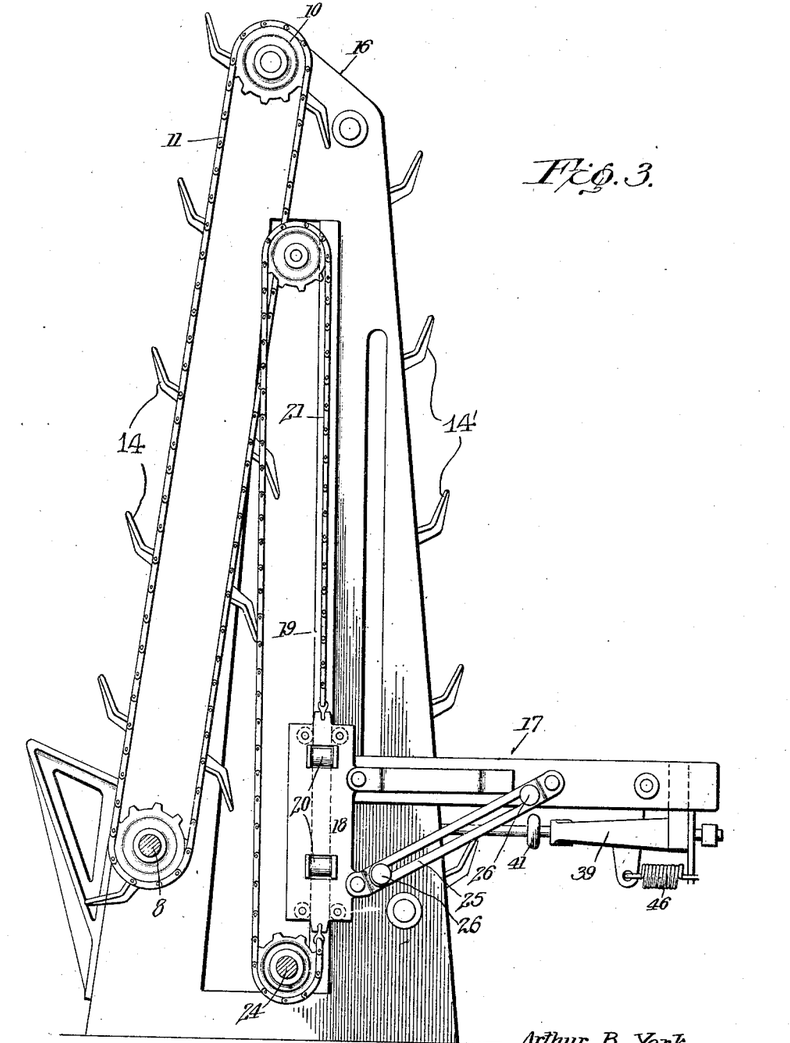
Figure 3 is an end view.
Figure 4:
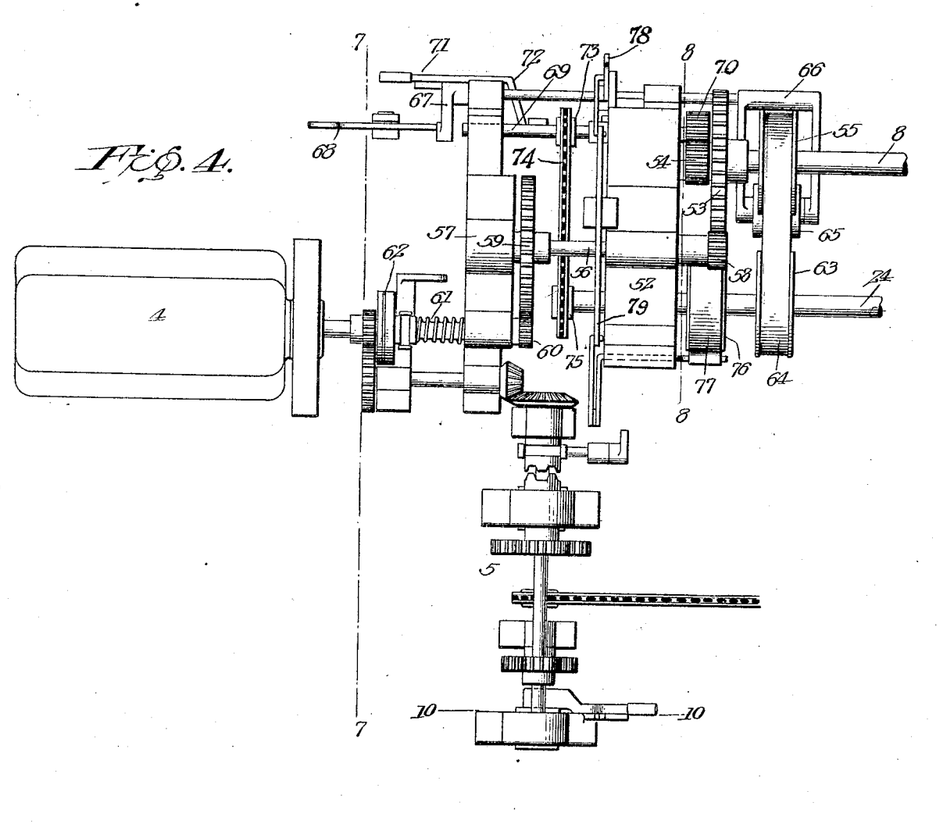
Figure 4 is a plan view.
Figure 5:
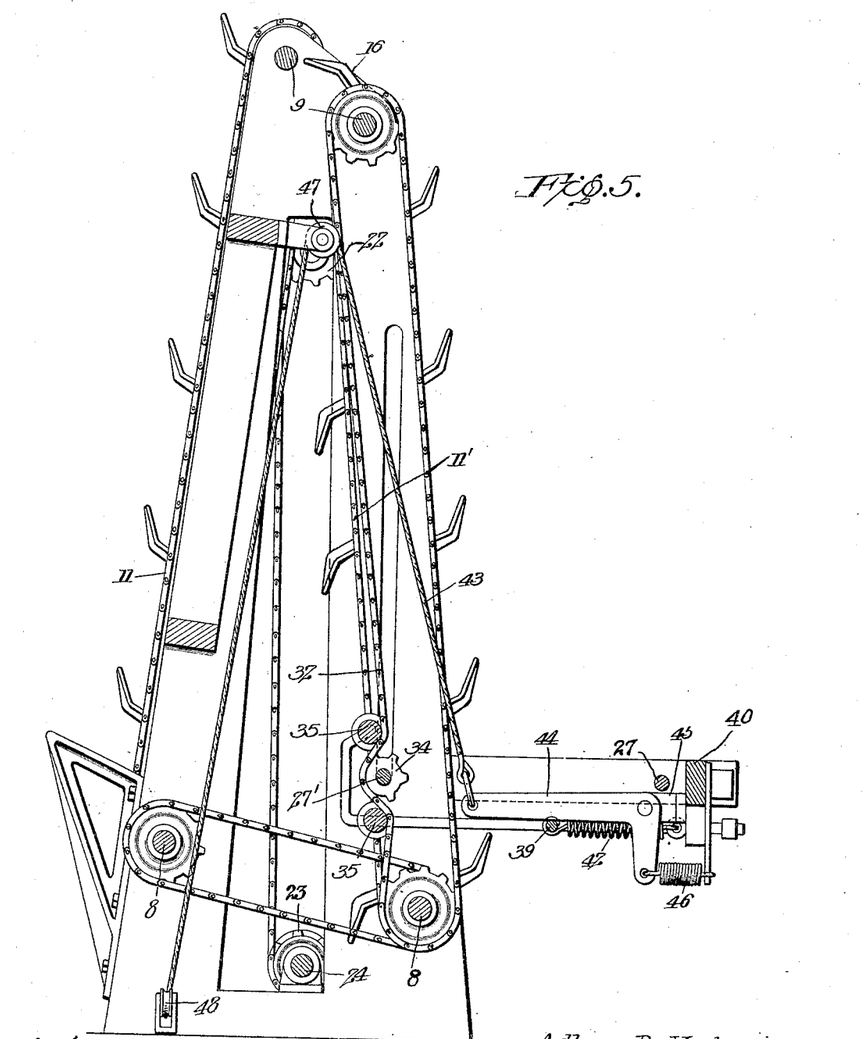
Figure 5 is a horizontal section on line 5—5 of Figure 1.
Figure 6:
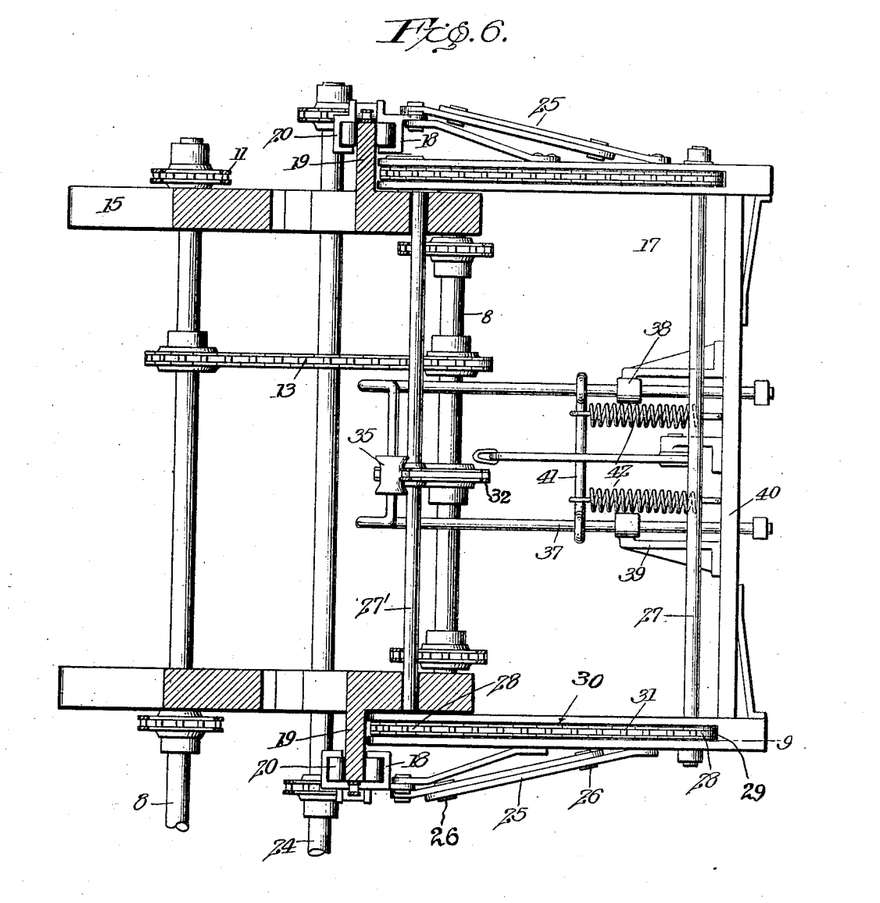
Figure 6 is a vertical section on line 6—6 of Figure 1.
Figure 7:
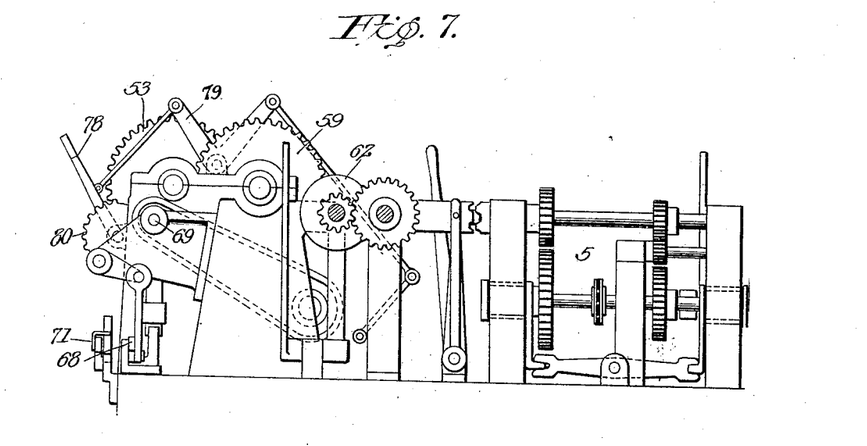
Figure 7 is a section on line 7—7 of Figure 4.
Figure 8:
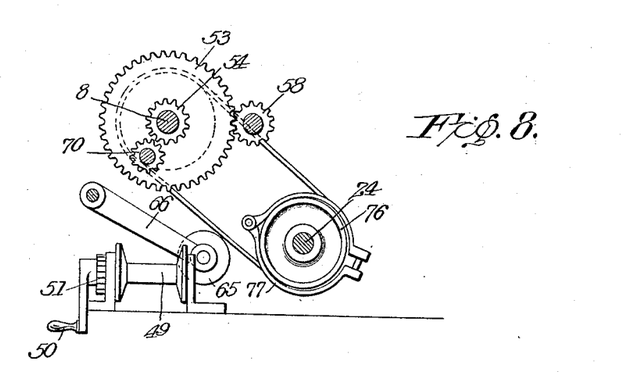
Figure 8 is a section on line 8—8 of Figure 4.
Figure 9:
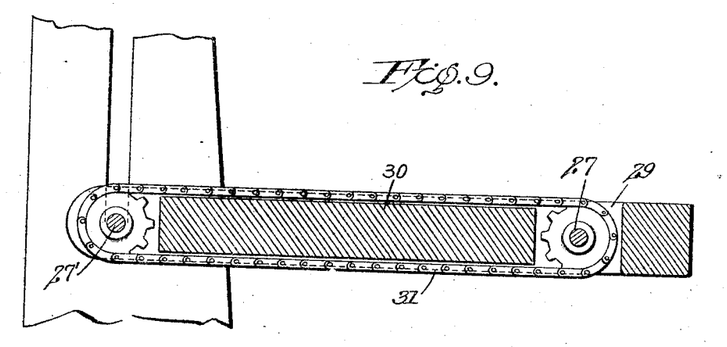
Figure 9 is a section on line 9—9 of Figure 6.
Figure 10:
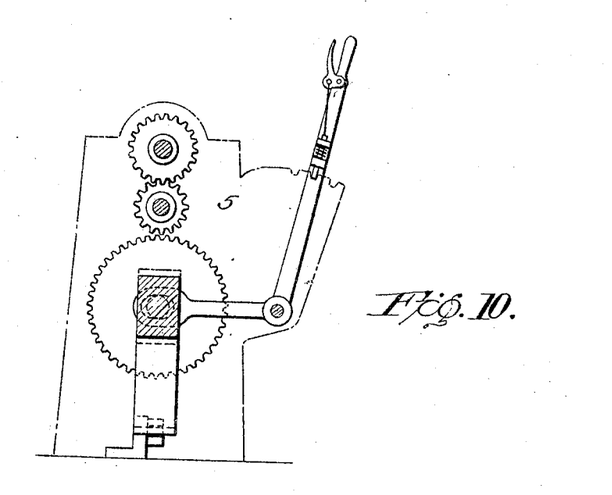
Figure 10 is a section on line 10—10 of Figure 4.

In these views 1 indicates a truck which is provided with the rear traction wheels 2 and the front steering wheels 3. The rear wheels are driven from the motor 4, mounted on the truck by means of suitable transmission means, which are generally illustrated at 5, such means including reversal means so that the truck can be driven either forwardly or backwardly. The front wheels are suitably connected with the steering wheel 6 so that the truck can be steered by an operator on the truck platform.

A tower 7 is supported by the platform of the truck, this tower being of inverted V-shape as shown and suitably journaled in the lower part of said tower is a pair of shafts 8 while a pair of shafts 9 are journaled in the upper part of the tower. Adjacent each end of each shaft is secured a sprocket wheel 10 and chains 11 and 11' engage said sprocket wheels, the pair of chains 11 engaging the sprocket wheels on one pair of the upper and lower shafts while the chains 11' engage the other pair of upper and lower shafts. A sprocket wheel 12 is secured to the central part of each of the lower shafts 8 and the chain 13 passes over these sprockets so that the two sets of chains 11 and 11' will be driven in unison. These two sets of chains are the same length though the shafts of the chains 11' are located slightly below the shafts for the chains 11. The chains 11 carry projections 14 which are spaced apart while the chains 11' carry the projections 14', said projections 14' being reversely arranged with respect to the projections 14. The projections 14 are designed to engage the boards or other pieces of lumber placed on the brackets 15 and to carry such boards upwardly to the top of the tower. As the projections are carried around the upper sprocket wheel the lumber will drop from the same and slide down the guides 16, at the top of the tower, until they are caught by the projections 14' on the chains 11' which will convey the boards downwardly. It will be seen that the lower shafts 8 are carried by the broad part of the tower so that they are spaced farther apart than are the upper shafts 9.

In order to take the boards from the downwardly moving chains and convey them on to the top of the lumber pile I provide a conveyor table 17 which has its inner end hingedly secured to the two carriages 18 which are vertically movable on the uprights 19 which are secured to the ends of the tower. These carriages are of channel shape in cross section and rollers 20 are journaled in the bottom and sides of each carriage to engage the upright. Each carriage is connected at its top and bottom with the ends of a chain 21 which passes over a sprocket wheel 22 at the top of the upright and over a sprocket 23 which is carried by a shaft 24 journaled in the lower part of the tower and driven in a manner to be hereinafter described so that the carriages can be raised and lowered to adjust the conveyor table as desired. The table is connected with each carriage by the two slotted braces 25, one brace being pivotally connected with the carriage and the other with the table and the two braces are connected together by the bolts 26, each bolt being carried by one brace and passing through the slot in the other brace and these parts are so arranged that when the bolts are engaging the outer ends of the slots the table will be in horizontal position and thus further downward movement of said table will be prevented though said table can be swung upwardly as the arrangement of bolts and slots will permit extension of the brace members.

The table carries a pair of shafts 27 and 27', one adjacent each end thereof, and each shaft carries a pair of sprockets 28 which are located in slots 29 formed in the end beams of the table, the shafts passing through said end beams. The upper and lower faces of the beams are grooved, as at 30, between said slots to receive the chains 31 which engage the sprockets 28. As will be seen the chains 11', which convey the lumber downwardly, pass through the table so that the pieces of lumber on said chains will be deposited on the table and will be conveyed horizontally to the outer end of said table by the chains 31. I extend the beams a distance beyond the slots so that the lumber will be left on the end of the table by the chains 31 so that the lumber can be removed therefrom on to the pile by the men stationed on the pile for straightening the lumber.

The means for driving the conveyor chains 31 on the table consists of an endless chain 32 passing around sprockets 33 on the shafts 8 and 9 for the chains 11' and this chain is made to engage a sprocket 34 on shaft 27' of the table by means of the upper and lower rollers 35 which are carried by a frame 36 which is connected with the inner ends of the longitudinally movable bars 37 carried by the table. These bars pass through the eyes 38 formed in the brackets 39 which are connected to the end beam 40 of the table, and through this beam. These bars 37 are connected together intermediate their ends by the cross bar 41 and springs 42 connect such cross bar with the beam 40. These springs tend to yieldingly hold the rollers 35 against the chain 32 so as to keep said chain in engagement with the sprocket 34 on shaft 27' of the carriage and thus cause the movement of said chain to be transmitted to the chains of the table.

The means for swinging the table upwardly out of the way of lumber piles and the like when the apparatus is being moved, consists of a cable 43 connected to the long arm of an L-shaped lever 44 which is pivoted to a bracket 45 extending inwardly from the cross piece 40 of the table and having its short arm connected with the spring 46 carried by the table. The cable passes upwardly around the pulley 47 at the top of the tower and then downwardly around the pulley 48 on the truck to the drum 49 on the truck which is provided with the handle 50 and the ratchet mechanism 51 for preventing unwinding of the cable from the drum.

It will thus be seen that when the drum is rotated the cable will be wound thereupon so as to swing the table upwardly. When it is desired to lower the table the ratchet mechanism is released so that the weight of the table will unwind the cable from the drum. The spring operated lever 44 will prevent the parts from interfering with the movement of the lumber on the table.

The lower shaft 8 for the elevator chains 11 is extended at one end and this extended end is journaled in the post 52. This extension carries a large gear 53, a small gear 54 and a pulley 55. A stub shaft 56 journaled in the posts 52 and 57 carries a small gear 58 which meshes with the large gear 53, and a large gear 59 which meshes with a small gear 60 on the shaft 61 which is connected with the engine shaft by the clutch means 62. In this way the shaft 8 of the elevator chains 11 can be driven from the motor when desired and as this shaft is connected with the sprocket and chains for the other shaft 8 for the chains 11' which move the lumber downwardly these chains will also be driven by the motor.

The means for rotating the shaft 24 for moving the carriages and table vertically comprises a pulley 63 on said shaft 24 and a belt 64 which passes over said pulley 63 and the pulley 55 on the extension of shaft 8. This belt is loosely arranged so that it will normally slip on the pulleys but is adapted to be tightened by the pulley 65 carried by the frame 66 which is connected with the crank rod 67, operated by the lever 68. Thus by moving said lever the belt can be tightened to cause the shaft 24 to be rotated in one direction from the shaft 8 to lower the carriages and table.

The means for rotating the shaft 24 in the opposite direction to raise the carriages and table comprises a stub shaft 69 journaled in the posts on the truck and having limited rocking movement so that the gear 70 can be moved into and out of mesh with the small gear 54 on the extension of shaft 8 by means of the hand lever 71 and the connections 72 which connect said lever with the shaft. This shaft 69 is provided with a sprocket 73 over which passes a chain 74 which also passes over a sprocket 75 on the end of shaft 24. This shaft 24 is provided with a brake drum 76, the band 77 of which is connected with the lever 78 by the connections 79. This lever 78 is provided with ratchet mechanism 80 so that it can be locked in position with the brake applied to prevent movement of the carriage and table.

It will thus be seen that the carriages and table can be raised and lowered by manipulating the hand levers to drive shaft 24 in one direction by means of the belts and pulleys and in the other direction by means of the rockable stub shaft and its gears and chain. After the table has been adjusted to its proper position it can be held against movement by applying the brake.

In order to prevent the lumber from being thrown on to the table or pile as it is carried over the top of the tower by the elevator chains, if it should fail to be caught by the projections on the descending chains I provide a guard 81 which consists of a frame located at one side of the tower at the top thereof and held spaced therefrom by the pieces 82.

When lumber brought into the yard is to be placed upon a pile the apparatus is moved to a point adjacent the pile upon which the new lumber is to be placed. If the other piles of lumber prevent passage of the apparatus the table may be swung upwardly out of the way by means of the drum and the cable as before explained. When the apparatus reaches the pile upon which the new lumber is to be placed the table is made to assume its horizontal position by releasing the ratchet mechanism of the drum. The table is then adjusted so that it will be a slight distance above the top of the pile, this movement of the table being carried out by manipulating the hand levers to either raise or lower the carriages as before explained. The new lumber is then placed on the brackets 15 so that the pieces will be caught by the projections on the ascending chains and carried to the top of the tower and delivered to the projections of the descending chains. These descending chains will place pieces of the lumber on the table and the chains of said table will convey the pieces to the outer end of said table where the men or man on the pile can pull them off and properly place them on the pile. Thus the lifting of the pieces of lumber from the ground on to the top of the pile is carried out and the only lifting necessary by the men is to place the lumber on the brackets and to pull the pieces of lumber from the table. Thus the manual work is reduced to a minimum and my invention enables two men to pile more lumber than could be piled by a large number of men working under the old system.

The various movements of the different parts are controlled by hand levers and the power for working the different parts of the apparatus and for propelling the truck is all derived from one motor.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a lumber piling mechanism, a tower including parallel beams having vertical parallel slots, means for conveying lumber up one side of the tower, means at the opposite side of the tower for conveying the lumber downwardly, a normally horizontally arranged table at the last mentioned side of the tower adapted to receive the lumber from the lowering means, a shaft carried by the inner end of the table and received in the slots, slides arranged upon the opposite faces of the tower, gearing for raising and lowering the slides and retaining them in adjusted position, pivotal connections between the table and slides, a second shaft carried by the outer end of the table, and horizontally movable conveyors associated with the shaft.

2. In a lumber piling mechanism, a tower including parallel beams having vertical parallel slots, means for conveying lumber up one side of the tower, means at the opposite side of the tower for conveying the lumber downwardly, a normally horizontally arranged table at the last mentioned side of the tower adapted to receive the lumber from the lowering means, a shaft carried by the inner end of the table and received in the slots, slides arranged upon the opposite faces of the tower, gearing for raising and lowering the slides and retaining them in adjusted position, pivotal connections between the table and slides, a second shaft carried by the outer end of the table, and having horizontally movable conveyors associated with the shaft, an L-shaped arm pivoted to the table, a spring connected with the table and one of the ends of the arm, a pulley on the tower, a flexible element passing around the pulley and having one end connected with the opposite end of the L-shaped arm whereby to swing the table to a position to extend substantially parallel to the tower.

In testimony whereof I affix my signature.

ARTHUR B. YORK.